United States Patent [19]

McGregor et al.

[11] Patent Number: 5,264,276

[45] Date of Patent: Nov. 23, 1993

[54] CHEMICALLY PROTECTIVE LAMINATE

[75] Inventors: Gordon L. McGregor, Landenberg, Pa.; Richard Winkelmayer, Jr., North East, Md.

[73] Assignee: W. L. Gore & Associates, Inc., Newark, Del.

[21] Appl. No.: 1,351

[22] Filed: Jan. 7, 1993

Related U.S. Application Data

[62] Division of Ser. No. 863,932, Apr. 6, 1992, abandoned.

[51] Int. Cl.$^5$ .............................................. B32B 7/00
[52] U.S. Cl. .................................. 428/252; 156/306.6; 156/308.2; 156/309.6; 428/246; 428/296; 428/316.6; 428/420; 428/421; 2/2; 2/243.1; 2/904
[58] Field of Search ............... 428/246, 252, 296, 420, 428/421, 316.6; 156/306.6, 308.2, 309.6; 2/2, 243 A

[56] References Cited

U.S. PATENT DOCUMENTS

| 4,610,918 | 9/1986 | Effenberger et al. | 428/246 |
| 4,816,330 | 3/1989 | Freund et al. | 428/286 |
| 4,946,736 | 8/1990 | Sassa | 418/245 |

FOREIGN PATENT DOCUMENTS

| 0202996 | 5/1986 | European Pat. Off. |
| 320258 | 12/1988 | European Pat. Off. |
| 2737756 | 8/1977 | Fed. Rep. of Germany |
| 1-156052 | 6/1989 | Japan |

*Primary Examiner*—James J. Bell
*Attorney, Agent, or Firm*—Samuels, Gary A.

[57] ABSTRACT

A chemically protective laminate comprising a thin thermoplastic barrier layer, having a consistent thickness, laminated between two porous polymeric membrane layers. The porous polymeric membrane may be of porous polytetrafluoroethylene, preferably expanded porous polytetrafluoroethylene. The chemically protective laminate may be subsequently adhered to a backing to form a fabric laminate capable of being assembled into a chemically protective article.

10 Claims, 5 Drawing Sheets

5,264,276

CHEMICALLY PROTECTIVE LAMINATE

CROSS-REFERENCE TO RELATED APPLICATIONS

This application is a division of application Ser. No. 07/863,932 filed Apr. 6, 1992, now abandoned.

FIELD OF THE INVENTION

This invention relates to a chemically protective, flexible laminate; and more particularly to a multi-layered laminate having a thin thermoplastic barrier layer and two porous polymeric membrane layers.

BACKGROUND OF THE INVENTION

In order to limit exposure of humans to toxic and/or hazardous chemicals, protective clothing materials have been developed which provide protection against exposure to these chemicals. Personnel required to wear garment systems fabricated from protective clothing materials include those workers at chemical manufacturing sites who risk coming in contact with toxic and/or hazardous chemicals in spite of engineering controls implemented to contain these chemicals. Personnel are also required to wear garment systems for protection against exposure from toxic and hazardous chemicals where engineering controls are not available to minimize their exposure to the hazardous chemical agents, such as for example during remediation of a hazardous waste site, or in an emergency situation such as a chemical spill or fire or during chemical warfare where military personnel may be exposed to such noxious chemical agents as blister agents such as Mustard gas or nerve agents during military operations.

Contact with these toxic and/or hazardous chemicals can result in harm to the human body ranging from acute trauma, such as dermatitis, burns or poisoning, to chronic effects such as cancer.

Toxic and/or hazardous chemicals may affect protective clothing materials in various ways. The toxic and/or hazardous chemical may degrade protective clothing materials by effecting a deleterious change in one or more physical properties of the protective clothing material upon contact with the toxic and/or hazardous chemical. The toxic and/or hazardous chemical may penetrate protective clothing materials through closures, pores or other imperfections in the protective clothing material. The toxic and/or hazardous chemical may permeate protective clothing materials through the chemically protective material on a molecular level. When the toxic and/or hazardous chemicals present a risk in minute quantities, chemically protective materials must limit the permeation of the chemical through the material for a period of time.

Permeation rates of a particular toxic and/or hazardous chemical for a given chemically protective material are ordinarily determined on a per unit thickness basis. To predict the degree of protection offered by a particular chemically protective material against a particular chemical challenge, one must have a chemically protective material with a predictable thickness. Increasing thickness of a chemically protective material may not be desirable in a certain chemically protective material since too great an increase in thickness of the chemically protective material may decrease that chemically protective material's aesthetics and drape. Increasing the thickness of a chemically protective material may also result in an increase in the weight per unit area of the chemically protective material thereby decreasing the aesthetics of articles produced from the chemically protective material.

Typically, chemically protective materials have been fabricated from polymeric materials, such as butyl rubber, nitrile rubber, and fluorinated rubbers such as for example Viton ® rubber. These materials may be used alone to fabricate chemically protective materials or in combination with reinforcing materials such as polyamide or polyester fabric to provide additional strength to the chemically protective materials.

Fluoropolymers have also been used as a barrier to chemical exposure. Fluoropolymers are of great utility due to their chemical inertness. These materials are also combined with reinforcing materials so that extra strength is provided. However, fluoropolymers typically have poor aesthetics and do not provide adequate drape for garments.

One type of fluoropolymer barrier material is taught in U.S. Pat. No. 4,610,918 to Effenberger et al. This patent teaches a wear-resistant fluoropolymer-containing flexible composite. The composite is produced through a process of initially coating a flexible substrate such as glass fabric or a metal mesh with a dispersion of a fluoropolymer such as polytetrafluoroethylene and subsequently coating the flexible substrate with a blend of a fluoropolymer, such as polytetrafluoroethylene and a "hard polymer". The resultant fluoropolymer barrier material is said to resist cracking. However, obtaining a consistent coating thickness without any thin areas or pin holes would be quite difficult using the above-mentioned process of dispersion deposition.

Another type of fluoropolymer barrier material is taught in U.S. Pat. No. 4,816,330 to Freund et al. This patent teaches a chemically resistant garment material formed from a laminate of skived polytetrafluoroethylene adhered to a cloth substrate. Skived polytetrafluoroethylene is said to be virtually pin hole free and therefore provides an improvement over polytetrafluoroethylene dispersion coated fabrics in permeation resistance.

Another type of fluoropolymer barrier material is taught in U.S. Pat. No. 4,946,736 to Sassa. This patent teaches a laminate composed of various layers which is useful as a covering for a radome as well as being useful as a material in protective garments. This laminate is produced by first laminating a woven polytetrafluoroethylene fabric impregnated with an amount of a polytetrafluoroethylene dispersion to a porous polytetrafluoroethylene layer. A second laminate is produced by adhering a second porous polytetrafluoroethylene layer to a thermoplastic polymeric layer such as fluorinated ethylene propylene (FEP). Subsequently, the thermoplastic polymeric layer of the second laminate is adhered to the porous polytetrafluoroethylene layer of the first laminate to form the fluoropolymer barrier material. While this laminated material appears to exhibit acceptable aesthetic qualities for use as a chemically protective barrier material, the thermoplastic polymeric layer exhibits inconsistent thicknesses resulting from deformation of the thermoplastic polymeric layer against the polytetrafluoroethylene fabric in the final lamination step. These inconsistent thicknesses have a detrimental effect on the permeation resistance of this material thereby limiting its utility in protective garments.

BRIEF DESCRIPTION OF THE INVENTION

This invention provides a chemically protective laminate comprising, in sequence; a first layer of porous polytetrafluoroethylene, a thin layer of a thermoplastic barrier polymer having a consistent thickness, a second layer of porous polytetrafluoroethylene, and a fabric layer adhered to one of the layers of porous polytetrafluoroethylene.

This invention also provides a process for producing a chemically protective laminate comprising, in sequence, the steps of; interposing a thin layer of a thermoplastic barrier polymer between two porous polytetrafluoroethylene layers, melting the thin layer of a thermoplastic barrier polymer and adhering it to the two porous polytetrafluoroethylene layers, and adhering a backing layer to one of the porous polytetrafluoroethylene layers.

DETAILED DESCRIPTION OF THE INVENTION

Figure 4:
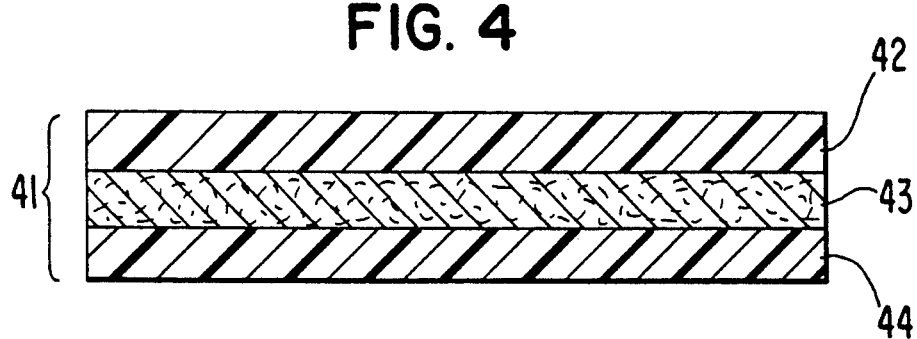
FIG. 4 is a cross-section of a chemically protective intermediate laminate used in the instant invention.

The present invention can best be described with reference to the drawings. FIG. 4 describes a cross-section of a laminate 41 used to make the invention. Two layers of porous polytetrafluoroethylene (PTFE) 42 and 44 are depicted. Preferably, the porous PTFE is expanded porous polytetrafluoroethylene (ePTFE). The expanded porous PTFE is produced through expansion of PTFE by the process taught in U.S. Pat. No. 3,953,566 to Gore producing an expanded PTFE layer made of nodes interconnected by fibrils in the configuration of a membrane as taught in U.S. Pat. No. 4,187,390 also to Gore.

A thin layer of a thermoplastic barrier polymer 43 is between and is adhered to the layers of porous PTFE 42 and 44. The thermoplastic barrier polymer layer 43 has a thickness of about 51 to 130 microns. The thin layer of thermoplastic barrier polymer 43 is preferably a fluorinated thermoplastic polymer. The preferred fluorinated thermoplastic polymer is fluorinated ethylene propylene (FEP), but other fluorinated thermoplastic polymers may be used. Examples of other fluorinated thermoplastic polymers which are of utility as the thermoplastic polymer may be selected from the group consisting of a copolymer of tetrafluoroethylene and perfluoro(propyl vinyl ether) (PFA), homopolymers of polychlorotrifluoroethylene (PCTFE) and its copolymers with TFE or VF2, ethylene-chlorotrifluoroethylene (ECTFE), ethylene-tetrafluoroethylene (ETFE) copolymer, polyvinylidene fluoride (PVDF), and polyvinylfluoride (PVF). Non-fluorinated thermoplastic polymers may be used for layer 43 where they possess sufficient barrier characteristics against a particular toxic and/or hazardous chemical challenge. Useful non-fluorinated thermoplastic polymers may be selected from the group consisting of polyethylene and polypropylene.

The thin layer of thermoplastic barrier polymer is laminated to the two porous PTFE layers through application of heat and pressure to melt the thin layer of thermoplastic barrier polymer and force a portion of the melted thermoplastic barrier polymer into a portion of the pores found in the porous PTFE layer thereby effecting a bond between the thin layer of thermoplastic barrier polymer and each of the porous PTFE layers.

The lamination step is performed on a heated pressurized nip at a temperature above the melt point of the thin layer of thermoplastic barrier polymer into which all three layers (42, 43 and 44) are fed simultaneously. Both of the porous PTFE layers have flat profiles. The nip used to assemble the three layer laminate contains a pair of rolls having faces with flat profiles.

Simultaneous lamination of the thin layer of thermoplastic barrier polymer interposed between the porous PTFE layers prevents the thin layer of thermoplastic barrier polymer from directly contacting a heated nip roll during the formation of the chemically protective laminate thereby lowering the possibility of the thin layer of thermoplastic barrier polymer adhering to the heated pressurized nip or otherwise being damaged during this lamination step. The porous PTFE layers provide a measure of structural reinforcement to the thin thermoplastic barrier polymer during the lamination step thereby minimizing whatever stretching or distortion the thin layer of thermoplastic barrier polymer may experience while in a softened state within the heated nip. Finally, the porous PTFE layers deform in a normal direction thereby reducing forces transmitted from the heated nip to the thin layer of thermoplastic barrier polymer.

The maintenance of the thin layer of thermoplastic barrier polymer's thickness is important since to decrease a chemically protective material's thickness increases permeability to a particular toxic and/or hazardous chemical. Providing a chemically protective material with a consistent thickness offers a degree of certainty as to the amount of protection provided by the chemically protective material against a toxic and/or hazardous chemical. As thickness of the thermoplastic barrier polymer is decreased maintenance of a nominal thickness becomes critical. For example, the preferred thermoplastic polymer, FEP, at given delta thickness, produces a greater effect in water vapor permeation rate at thicknesses below 51 microns than at thicknesses above 51 microns.

However, it is desirable to minimize the chemically protective material's thickness to increase the material's flexibility, aesthetics and drape. Minimization of the chemically protective material's thickness also decreases the weight per unit area of the chemically protective material.

Figure 5:
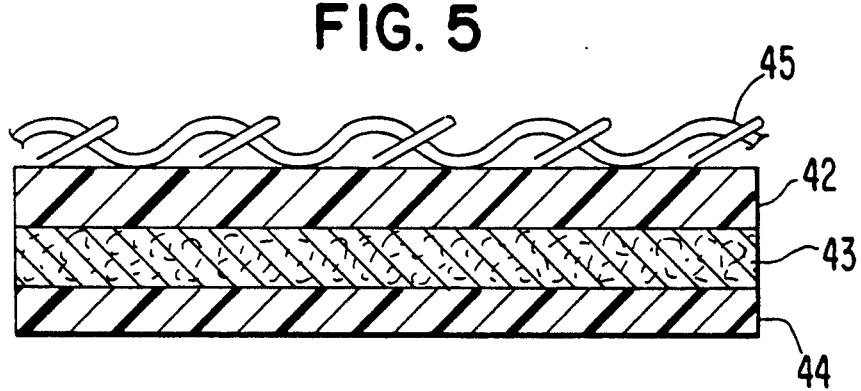
FIG. 5 is a cross-section of the chemically protective laminate of the instant invention having a backing layer.

Referring now to FIG. 5, a backing layer 45 is subsequently adhered to porous PTFE layer 42. The backing layer may be a fabric in woven, knitted or nonwoven form. The backing layer may be a synthetic material such as polyamide, polyester, aramide, olefin or the like. The backing material may be a nonsynthetic material such as cellulose or the like. The backing layer may be a blend of synthetic and nonsynthetic materials. If the backing layer is to exhibit a great amount of chemical inertness, the backing layer may comprise fibers of PTFE, preferably EPTFE.

The backing layer may be adhered to the porous PTFE layer by any means commonly known in the art including application of adhesives in either solvent-free or solvent-containing form, or through melting of the backing layer, but in every case, temperatures associated with the lamination step should be below the melt point of the thin layer of thermoplastic barrier polymer.

The following example is presented to further explain the teachings of the instant invention and not to limit the scope of the invention. Various modifications and equivalents will readily suggest themselves to those of ordinary skill in the art without departing from the spirit and the scope of the instant invention.

TEST METHOD

Determination of Thickness Consistency

A material is defined herein as having a "consistent thickness" when exhibiting a true coefficient of variation of 16.7% or less. A material which varies by no more than 3 sigma in a normal distribution and where 3 sigma is a value ⅙ or less of the material's mean thickness, will result in a true coefficient of variation of 16.7% or less.

In order to determine the true coefficient of variation, the following method is followed:

A sample of at least 1 meter square of material is obtained. A swatch of approximately 10.2 cm by 10.2 cm is obtained from an areas proximal to each of the corners of the sample. One swatch of approximately 10.2 cm by 10.2 cm is obtained from the approximate center of the sample. Two additional swatches are obtained randomly from areas between the center and the edges of the sample. Randomly from within each swatch, an approximate 1.3 cm by 1.3 cm segment of material is excised and mounted so that of an edge of the segment is presented in cross-sectional view within a scanning electron microscope (SEM).

Figure 6:
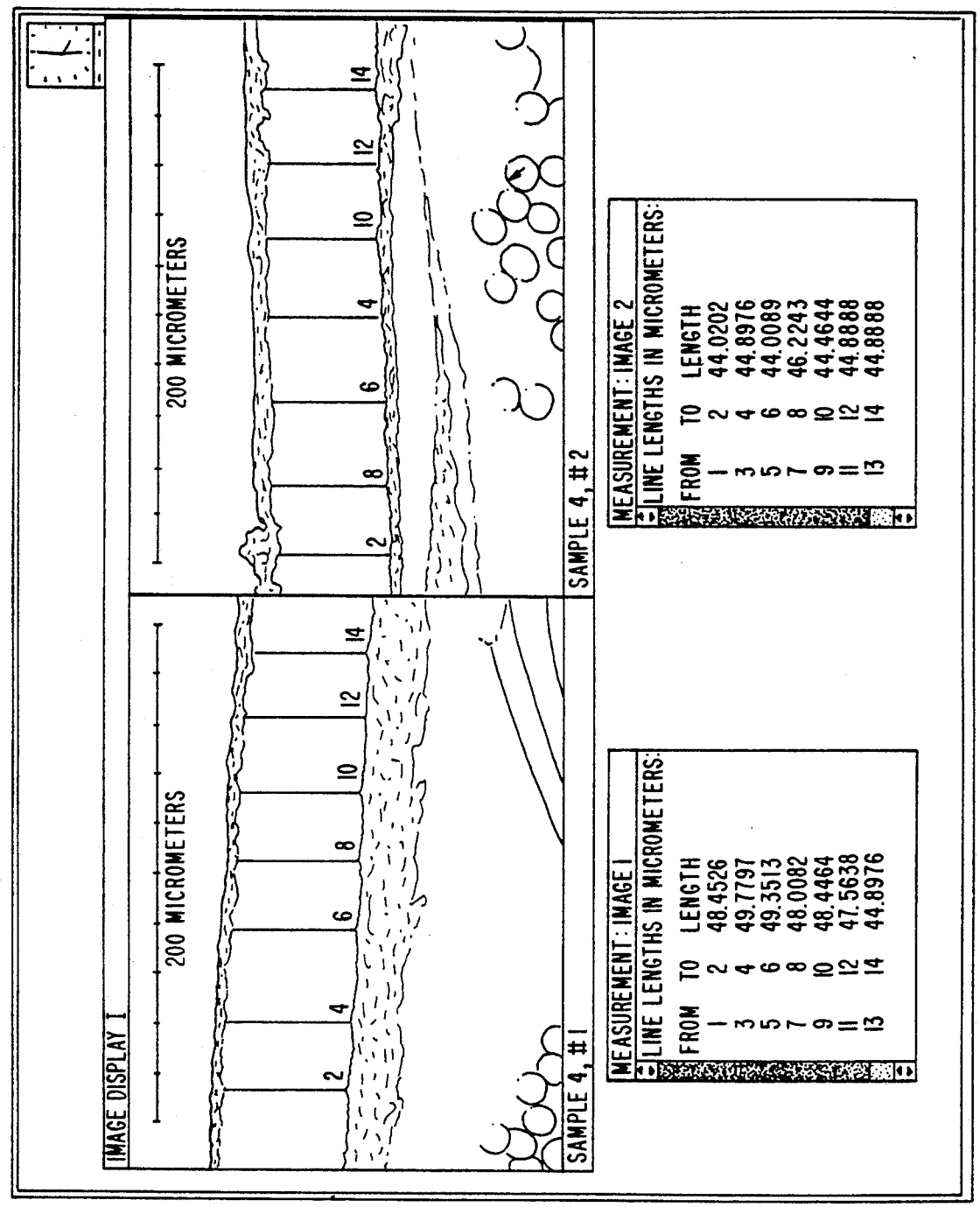
FIG. 6 is a photomicrograph of the chemically protective laminate of the Example shown in cross-section (magnified 500×) showing the secants used to determine the consistent thickness of the thermoplastic barrier layer.

Within each cross-sectional view, a pair of sibling views 200 um in breadth is produced within the SEM. Across each sibling view, seven evenly spaced secant lines perpendicular to the thin layer of thermoplastic barrier polymer are placed. Along these secant lines, a pair of points are placed defining a thickness value of the thin layer of thermoplastic barrier polymer along the secant line. A sibling view in cross-section of the instant laminate having secant lines is depicted in FIG. 6.

A mean and sigma of the 98 thickness values obtained by the above-described are calculated. The sigma is divided by the mean and multiplied by 100 to obtain an estimated coefficient of variation. Applying a 90% confidence interval, after assuming a population of 100, generates the true coefficient of variation.

EXAMPLE

A chemically protective laminate of the instant invention was produced in the following manner:

A 0.051 mm thin layer of thermoplastic barrier polymer of fluorinated ethylene propylene (FEP), (200 A available from E. 1. duPont de Nemours & Co.), was obtained. The thin layer of thermoplastic barrier polymer was interposed between two PTFE layers (GORE-TEX expanded polytetrafluoroethylene membranes available from W.L. Gore & Associates, Inc., Elkton, Md.). One PTFE layer, hereinafter designated as the porous PTFE layer, had an air permeability of 1.2 cubic meters per square meter (M/min) at 20 mm water gauge, a thickness of 0.051 mm, a mean pore size of 0.96 um, and a bubble point maximum pore size of 6.147 um as determined on a Coulter II porometer with Porofil fluorinated oil. The second PTFE layer, had an air permeability 8.4 re/min @20 mm water gauge, a thickness of 0.025 mm, a mean pore size of 3.367 um, and a bubble point maximum pore size of 6.147 um.

The three layers were fed through a pair of nipped rollers consisting of a chrome roll heated to a temperature of 475° C. and a silicone roll. The thinner layer of PTFE was positioned against the chrome roll and the thicker layer of porous PTFE layer was positioned against the silicone roll. The three layers traveled through the nip at a speed of 12.2 re/min with enough pressure applied by the nip to adhere the layers together thereby forming a chemically protective laminate.

Figure 2:
FIG. 2 is a photomicrograph of the chemically protective laminate of the Example shown in cross-section (magnified 100×).
Figure 3:
FIG. 3 is a photomicrograph of the chemically protective laminate of the Example shown in cross-section (magnified 250×).

The chemically protective laminate was then laminated to a backing layer, (94.9 g/m² nylon 6/6 taslite fabric available from Milliken & Co., Spartanburg, S.C.). The backing layer was laminated to the chemically protective laminate through application of a thermoplastic polyurethane adhesive on the thicker porous PTFE layer through the use of a gravure' roll and subsequent remelting of the polyurethane to effectuate a bond between the chemically protective laminate and the backing layer. FIG. 2 is a photomicrograph of the chemically protective laminate of the Example shown in a cross-sectional view magnified 100 times; while FIG. 3 was taken at 250 times.

The FEP layer of the instant laminate was determined to have an estimated coefficient of variation of 8.3% and, after applying a 90% confidence interval assuming a population of 100, a true coefficient of variation from 7.5 to 9.4%.

The resulting laminate was evaluated as a barrier to the penetration of a chemical agent vapors after being challenged by droplets of the chemical agent. A 5.1 cm circular sample of the Example was mounted with the backing layer facing upwards in a permeation cell and challenged by placing a ten 1 mg drops of chemical agent on the backing layer of the sample. An air flow rate of 1 liter per minute was maintained across both surfaces of the sample. Effluent flows were sampled, and the agent vapors were trapped on a solid sorbent tube and concentrated. Analysis of effluent flows from the side opposite the chemical agent yielded breakthrough times as well as a cumulative quantity of agent vapor which permeated through the sample. The limit of detection for this test was 0.03 ug/cm².

The test was conducted for a period of 24 hours with two replicates. A control material was also tested as well as two replicates of the FEP layer contained in the Example. The results of the testing were as follows:

| Sample | Vapor Penetration Test | | | | Cumulative Penetration (ug/cm²) |
|---|---|---|---|---|---|
| | (0–1 hr) | (1–2 hr) | (2–3 hr) | (3–24 hr) | |
| Example | ND | ND | ND | ND | ND |
| Example | ND | ND | ND | ND | ND |
| FEP | ND | ND | ND | ND | ND |
| FEP | ND | ND | ND | ND | ND |

-continued

| | Vapor Penetration Test | | | | |
|---|---|---|---|---|---|
| Sample | (0–1 hr) | (1–2 hr) | (2–3 hr) | (3–24 hr) | Cumulative Penetration (ug/cm$^2$) |
| Control | ND | ND | ND | ND | ND |

Note: "ND" denotes a value that is below 0.03 ug/cm$^2$.

COMPARATIVE EXAMPLE

For comparative purposes, a laminate made according to the teachings of U.S. Pat. No. 4,946,736 to Sassa was produced. A fabric layer was produced from 400 denier EPTFE fibers (Rastex fibers available from W.L. Gore and Associates, Inc., Elkton, Md.), woven into a 2×2 basketweave pattern. The fabric layer was coated with an aqueous dispersion of FEP (T 120 available from E. I. duPont de Nemours & Co., Wilmington, Del.) to obtain a 4% by weight add-on. The coated fabric layer was dried and cured at 200° C. The fabric layer was subsequently laminated to a first EPTFE layer having an air permeability of 1.2 m/min @200 mm water gauge, a thickness of 0.051 mm and a mean pore size 0.963 um (GORE-TEX membrane available from W.L. Gore and Associates, Inc., Elkton, Md.) through the application of sufficient heat and pressure to adhere the two layers together.

Figure 1:
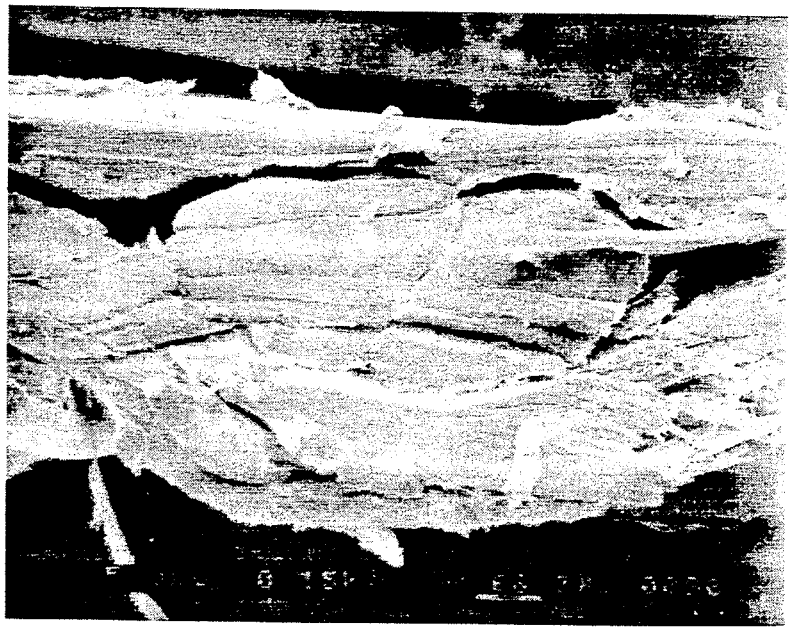
FIG. 1 is a photomicrograph of Comparative Example shown in cross-section (magnified 150×).

A layer of FEP having a thickness of 0.051 mm (200 A available from E. I. dupont de Nemours & Co., Wilmington, Del.) and a second ePTFE layer identical to the first EPTFE layer were subsequently laminated to the first EPTFE layer using a sufficient amount of heat and pressure. The resulting laminate of the comparative example is depicted in FIG. 1. The FEP layer of the comparative laminate was determined to have an estimated coefficient of variation of 26.2% and, after applying a 90% confidence interval assuming a population of 100, a true coefficient of variation from 23.6 to 29.7%.

Other embodiments of the invention will be apparent to those skilled in the art from a consideration of this specification or practice of the invention disclosed herein. It is intended that the specification and example be considered as exemplary only, with the true scope and spirit of the invention being indicated by the following claims.

We claim:

1. A chemically protective laminate comprising, in sequence:
   (a) a layer of porous polytetrafluoroethylene,
   (b) a thin layer of a thermoplastic barrier polymer having a thickness of between 51 microns and 130 micron and being adhered on a first side to the layer of porous polytetrafluoroethylene, said thin layer having a consistent thickness represented by a true coefficient of variation of 16.7% or less,
   (c) a second layer of porous polytetrafluoroethylene located on the other side of layer (a),
   (d) a backing layer adhered to one of the porous polytetrafluoroethylene layers.

2. A chemically protective laminate of claim 1 wherein the thin layer of thermoplastic barrier polymer is a fluorinated thermoplastic polymer.

3. A chemically protective laminate of claim 2 wherein the layer of fluorinated thermoplastic polymer is fluorinated ethylene propylene.

4. A chemically protective laminate of claim 2 wherein the layer of fluorinated thermoplastic polymer is selected from the group consisting of a copolymer of tetrafluoroethylene and perfluoro(propylvinyl ether), homopolymers of polychlorotrifluoroethylene and its copolymers with TFE or VF2, ethylene-chlorotrifluoroethylene copolymer, ethylene-tetrafluoroethylene copolymer, polyvinylidene fluoride, and polyvinylfluoride.

5. A chemically protective laminate of claim 1 wherein the thin layer of thermoplastic barrier polymer is selected from the group consisting of polyethylene and polypropylene.

6. A chemically protective laminate of claim 1 wherein the backing layer is a fabric.

7. A chemically protective laminate of claim 1 wherein the backing layer is a synthetic material.

8. A chemically protective laminate of claim 1 wherein the backing layer is made of fibers of expanded porous polytetrafluoroethylene.

9. A chemically protective laminate of claim 1, wherein the porous polytetrafluoroethylene is expanded porous polytetrafluoroethylene.

10. A process for producing a chemically protective laminate, comprising, in sequence, the steps of:
    (a) interposing a thin layer of a thermoplastic barrier polymer between two layers of porous polytetrafluoroethylene,
    (b) melting the thin layer of a thermoplastic barrier polymer, and,
    (c) adhering a backing layer to one of the porous polytetrafluoroethylene layers.

* * * * *